(12) United States Patent
Hintzer et al.

(10) Patent No.: US 7,560,517 B2
(45) Date of Patent: Jul. 14, 2009

(54) FLUOROPOLYMER FOR MAKING A FLUOROELASTOMER

(75) Inventors: Klaus Hintzer, Kastl (DE); Michael Jurgens, Neuotting (DE); Harald Kaspar, Burgkirchen (DE); Kai Helmut Lochhaas, Neuotting (DE); Werner Schwertfeger, Altoetting (DE)

(73) Assignee: 3M Innovative Properties Company, Saint Paul, MN (US)

( * ) Notice: Subject to any disclaimer, the term of this patent is extended or adjusted under 35 U.S.C. 154(b) by 381 days.

(21) Appl. No.: 11/280,880

(22) Filed: Nov. 16, 2005

(65) Prior Publication Data

US 2006/0135717 A1 Jun. 22, 2006

(30) Foreign Application Priority Data

Dec. 21, 2004 (GB) .................................. 0427913.9

(51) Int. Cl.
*C08F 8/32* (2006.01)
(52) U.S. Cl. ....................... 525/326.3; 524/544; 526/72; 526/242; 526/247; 526/248
(58) Field of Classification Search ............. 525/326.3; 524/544; 526/242, 247, 248, 72
See application file for complete search history.

(56) References Cited

U.S. PATENT DOCUMENTS

| | | | |
|---|---|---|---|
| 2,975,163 A | | 3/1961 | Lo |
| 4,273,728 A | | 6/1981 | Krespan |
| 4,349,650 A | | 9/1982 | Krespan |
| 5,463,006 A | * | 10/1995 | Abusleme et al. ............. 526/247 |
| 5,891,965 A | * | 4/1999 | Worm et al. .............. 525/326.3 |
| 6,255,535 B1 | * | 7/2001 | Schulz et al. ................ 568/596 |
| 6,613,846 B2 | * | 9/2003 | Hintzer et al. ............ 525/326.2 |
| 6,812,310 B2 | * | 11/2004 | Grootaert et al. ............ 526/253 |
| 6,916,871 B2 | * | 7/2005 | Hare et al. .................... 524/265 |
| 7,091,268 B2 | * | 8/2006 | Corveleyn ................... 524/275 |

FOREIGN PATENT DOCUMENTS

| | | |
|---|---|---|
| EP | 1160258 | 12/2001 |
| EP | 1160258 A1 * | 12/2001 |
| JP | 57-59921 * | 4/1982 |
| JP | 57059921 | 4/1982 |
| WO | WO01/49752 | 7/2001 |
| WO | WO2004/046206 | 6/2004 |

OTHER PUBLICATIONS

"Modern Fluoropolymers," Scheirs, Wiley Science 1997.

* cited by examiner

*Primary Examiner*—Peter D. Mulcahy
*Assistant Examiner*—Henry Hu
(74) *Attorney, Agent, or Firm*—Julie A. Lapos-Kuchar

(57) ABSTRACT

The present invention relates to a fluoropolymer comprising repeating units derived from one or more gaseous fluorinated olefins and having one or more cure sites comprising (a) a halogen capable of participating in a peroxide cure reaction or (b) a nitrile group, said fluoropolymer further comprising repeating units derived from one or more fluorinated allyl ethers of the formula:

$$CF_2=CF-CF(Z)-O-R_f \quad (I)$$

wherein Z represents F or $CF_3$ and $R_f$ represents a fluorinated alkyl group that may contain one or more catenary oxygen atoms. The fluoropolymer can be cured to a fluoroelastomer. The invention also relates to a curable fluoroelastomer composition comprising the fluoropolymer and a curing agent.

14 Claims, No Drawings

FLUOROPOLYMER FOR MAKING A FLUOROELASTOMER

CROSS-REFERENCE TO RELATED APPLICATION(S)

This U.S. patent application claims priority from United Kingdom patent application serial number 0427913.9, filed on Dec. 21, 2004.

FIELD OF THE INVENTION

The present invention relates to fluoropolymer suitable for making a fluoroelastomer. In particular, the present invention relates to an amorphous fluoropolymer that comprises one or more cure sites and that comprises one or more repeating units deriving from a fluorinated allylether.

BACKGROUND OF THE INVENTION

Fluoroelastomers and in particular perfluoroelastomers such as those described in "Modem Fluoropolymers", edited by John Scheirs, Wiley Science 1997, offer excellent protection against high service temperatures and are resistant to a wide variety of chemical reagents. Fluoroelastomers are generally divided in two main classes, namely those that are based on vinylidene fluoride (VF2) and those that do not contain VF2 and are based on perfluoro vinyl ethers, and tetrafluoroethylene (TFE) and/or chlorotrifluoroethylene (CTFE).

Fluoropolymers of VF2 and a perfluorovinyl ether may be used for producing fluoroelastomers having a low Tg. The fluoroelastomers having a particularly low Tg are generally obtained with highly levels of VF2, e.g. of 50 to 80 mol %. Unfortunately, the use of VF2 in fluoroelastomers generally reduces the chemical and heat resistance of the fluoropolymer and in particular, such fluoroelastomers may be prone to swelling when brought in contact with organic solvents as is for example the case in fuel system application. Thus, although a very low Tg can be achieved, this advantage is accompanied with a decrease of other physical properties.

Fluoropolymers may also contain VF2 and certain perfluorinated allyl ethers. The fluoropolymers are cured using a bisphenol cure composition and low Tg elastomers are obtained. Typically, the amount of VF2 used in the copolymers is 50 mol % or more. Thus, the low Tg fluoroelastomers suffer from the same disadvantages as disclosed above.

Fluoropolymers may also comprise fluorinated allyl ether repeating units. Nitrile functionalized fluorinated allyl ethers can be used to make fluoropolymers that can be cured to fluoroelastomers through a cure reaction involving the nitrile groups. No properties of such fluoroelastomers are disclosed however.

Krytox™ perfluoroalkyl polyether oils may be added to fluoropolymers to lower Tg. However, these plasticizers can be extracted by solvents over time.

Perfluoro-terpolymers may also consist of tetrafluoroethylene, perfluoromethyl vinylether and at least 3 mol % of certain long chain vinylethers. The long-chain vinylether lowers the Tg significantly, however the incorporation is rather difficult. Therefore, one has to run the polymerization in perhalogenated solvents (e.g. R 113) or in aqueous emulsion polymerization in the presence of fluorinated alcohols. The disadvantages of these systems are: the use of perhalogenated solvents (e.g. R 113) is often critical due to environmental concerns and the removal of the fluorinated alcohols is often very difficult because they act as swelling agents.

Aqueous emulsion polymerization may be used to copolymerize tetrafluoroethylene, hexafluoropropylene and perfluorovinylethers of the formula $CF_2=CFO-(CF_2CFXO)_m-R_f$ wherein X is F or $CF_3$, m is 1 to 50 and $R_f$ is a perfluoroalkyl group. Although these fluoroelastomers have a low $T_g$, their method of making involves polymerization times of up to 28 hours, making their manufacturing expensive. Similarly, the aqueous emulsion polymerization of tetrafluoroethylene and certain perfluorovinylethers required in polymerization times on the order of 30 hours.

It would now be desirable to find further fluoropolymers for making fluoroelastomers. In particular, it would be desirable to find fluoropolymers that can be manufactured in a cost effective way. Desirably the fluoropolymers are easy and conveniently processable in the making of fluoroelastomer articles therefrom. It would further be desired that fluoroelastomers made from such fluoropolymers have good or excellent mechanical and physical properties, including for example excellent chemical and heat resistance and low or no swelling with organic solvents. Desirably, the fluoropolymers would allow producing fluoroelastomers having a low Tg for example as may be required for fuel system applications in for example engines of airplanes.

SUMMARY OF THE INVENTION

In accordance with one aspect of the present invention, there is provided a fluoropolymer comprising repeating units derived from one or more gaseous fluorinated olefins and having one or more cure sites comprising (a) a halogen capable of participating in a peroxide cure reaction or (b) a nitrile group, said fluoropolymer further comprising repeating units derived from one or more fluorinated allyl ethers of the formula:

$$CF_2=CF-CF(Z)-O-R_f \qquad (I)$$

wherein Z represents F or $CF_3$ and $R_f$ represents a fluorinated alkyl group that may contain one or more catenary oxygen atoms.

In accordance with a further aspect, a curable fluoroelastomer composition comprising (i) a fluoropolymer as defined above and (ii) a curing agent, is provided. The invention also relates to fluoroelastomer articles obtained upon curing the curable fluoroelastomer composition.

In a still further aspect, the invention provides a method of making a fluoropolymer as defined above. The method comprises a copolymerization of one or more gaseous fluorinated olefins and one or more fluorinated allyl ethers according to formula (I).

It has been found that the fluoropolymers can be readily and cost effectively be produced even with fairly high levels of fluorinated allyl ether repeating units. In particular, the fluoropolymers can be produced at high temperature without compromising the properties of fluoroelastomers produced therefrom. Furthermore, it has been found that low Tg fluoroelastomers, e.g. of −25° C. or lower can be readily be produced, making such fluoroelastomers suitable for a variety of applications where low temperature properties are required such for example in sealings of turbine of airplanes. Further, the low Tg elastomers can be produced without the need for high levels of VF2 or even without the need for VF2, with the result that fluoroelastomers may be obtained that have combined beneficial properties of low Tg and good resistance to swelling when placed in contact with organic solvents, including fuels. Furthermore, fluoroelastomers may be produced that have good or excellent base resistance.

DETAILED DESCRIPTION OF THE INVENTION

The fluoropolymer according to the present invention is typically an amorphous fluoropolymer. That is, the fluoropolymer typically does not have crystallinity or has only a marginal amount of crystallinity. Thus, an amorphous fluoropolymer generally does not display a melting point or has only a marginal or hardly visible melting point. The fluoropolymer may have a fully fluorinated backbone but in particular embodiments also have a partially fluorinated backbone. Typically, the fluoropolymer will have at least 40% by weight of fluorine in the backbone, for example at least 50 or 65% by weight. The fluoropolymer according to the invention comprises repeating units deriving from a fluorinated allyl ether of the general formula:

$$CF_2=CF-CF(Z)-O-R_f \qquad (I)$$

wherein Z represents F or $CF_3$ and $R_f$ represents a fluorinated alkyl group that may contain one or more catenary oxygen atoms (i.e. in-chain oxygen atoms).

In one embodiment, Z in formula (I) represents a fluorine atom. Also, in a particular embodiment, the group $R_f$ is a fluorinated (poly)ether group such as for example a fluorinated group of the formula:

$$-(CF_2)_n-(OCF_2)_m-OR^a \qquad (II)$$

wherein n is an integer of 1 to 5, m is 0 or an integer of 1 to 10 and $R^a$ is a perfluoroalkyl group of 1 to 7 carbon atoms or an alkyl group of 1 to 7 carbon atoms. Examples of $R^a$ groups include perfluoroalkyl groups that may be linear or branched including for example perfluoromethyl, perfluoroethyl and perfluoropropyl groups. $R^a$ may further represent an alkyl group such as methyl or ethyl. In the above formula, n is typically 1, 2 or 3 and m is for example 0, 1, 2, 3 or 4.

Specific examples of fluorinated allyl ethers for use in accordance with this invention include:

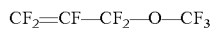
$$CF_2=CF-CF_2-O-CF_3$$

$$CF_2=CF-CF_2-O-C_3F_7$$

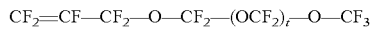
$$CF_2=CF-CF_2-O-CF_2-(OCF_2)_t-O-CF_3$$

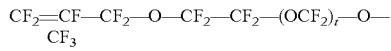
$$CF_2=CF-CF_2-O-CF_2-CF_2-(OCF_2)_t-O-CF_3$$

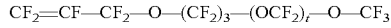
$$CF_2=CF-CF_2-O-(CF_2)_3-(OCF_2)_t-O-CF_3$$

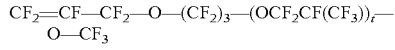
$$CF_2=CF-CF_2-O-(CF_2)_3-(OCF_2CF(CF_3))_t-O-CF_3$$

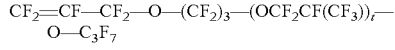
$$CF_2=CF-CF_2-O-(CF_2)_3-(OCF_2CF(CF_3))_t-O-C_3F_7$$

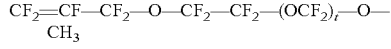
$$CF_2=CF-CF_2-O-CF_2-CF_2-(OCF_2)_t-O-CH_3$$

$$CF_2=CF-CF_2-O-(CF_2)_3-(OCF_2)_t-O-CH_3$$

wherein t is 0, 1, 2, 3, 4, or 5.

The fluoropolymer may comprise a mixture of repeating units deriving from a mixture of fluorinated allyl ethers. The amount of repeating units deriving from the fluorinated allyl ethers in the fluoropolymer is not particularly limited and may be varied according to the desired properties in the fluoroelastomer such as for example the Tg of the fluoroelastomer. Generally and depending on the type of fluorinated allyl ether used, an amount of repeating units derived from fluorinated allyl ethers as low as 2 mole % may already have a substantial impact on the Tg of the fluoroelastomer. Typically, the amount of repeating units deriving from fluorinated allyl ethers according to formula (I) is between 2 and 30 mol %. According to a particular embodiment, the amount may be between 3 and 25 mol % and according to a still further embodiment, the amount may be between 5 and 20 mol %. Amounts between 4 and 15 mol % usually give satisfactory results in a variety of applications. Depending on the amount of the allyl ether used and on the nature of comonomers used, fluoropolymers can be obtained that having a glass transition temperature of not more than $-10°$ C., for example not more than $-20°$ C. In particular embodiments, fluoropolymers with a Tg of $-25°$ C. or less or $-35°$ C. or less can be obtained.

The fluoropolymer of the present invention further comprises one or more gaseous fluorinated monomers which may be perfluorinated or not. Examples of gaseous fluorinated monomers include chlorotrifluoroethylene (CTFE), tetrafluoroethylene (TFE), chlorotrifluoroethylene, vinyl fluoride, vinylidene fluoride (VF2) and perfluoroalkyl vinyl monomers such as hexafluoropropylene (HFP). The fluoropolymer may further comprise repeating units deriving from non-fluorinated comonomers such as for example olefins such as ethylene and propylene.

The fluoropolymer further has one or more cure-sites. Suitable cure-sites include halogens capable of participating in a peroxide cure reaction such for example a bromine or iodine atom. Further cure-sites include nitrile groups. The cure-sites may be contained in the end-groups of the polymer and/or may be distributed along the chain of the polymer. Generally, the amount of cure-sites in the fluoropolymer is between 0.1 and 5 mol %, for example between 0.2 and 3 mol %.

Particular examples of fluoropolymers according to the invention are copolymers of tetrafluoroethylene and vinylidene fluoride, copolymers of tetrafluoroethylene and ethylene or propylene, copolymers of tetrafluoroethylene and hexafluoropropylene, copolymers of tetrafluoroethylene, vinylidene fluoride and hexafluoropropylene and copolymers of tetrafluoroethylene, hexafluoropropylene and ethylene or propylene. It is understood that the fluoropolymers enumerated in this paragraph further contain one or more fluorinated allyl ethers of formula (I) and further comprise one or more cure-sites.

In a particular embodiment of the invention, a fluoropolymer is used that contains 45 mol % or less of VF2, for example not more than 30 mol % or not more than 20 mol %. In a still further embodiment, the fluoropolymer contains no VF2 or less than 5 mol % of VF2. Fluoropolymers with a low amount of VF2 can be used to produce fluoroelastomers that have a good base resistance and have little or no swelling against organic solvents and fuels.

The fluoropolymers can be obtained with any of the known polymerization techniques including solution polymerization and suspension polymerization. The fluoropolymers are generally made through an aqueous emulsion polymerization process, which can be conducted in a known manner. In a particular embodiment, the fluorinated allyl ether is provided to the polymerization as a preemulsion. That is, the fluorinated allylether is prior to the polymerization emulsified in water using a fluorinated surfactant e.g. as described below. The so obtained emulsion of the allyl ether is then used for feeding the fluorinated allyl ether to the polymerization reaction. Alternatively the allylether can be preemulsified and charged as a whole as for example described in EP 1,160,258. The reactor vessel for use in the aqueous emulsion polymerization process is typically a pressurizable vessel capable of withstanding the internal pressures during the polymerization reaction. Typically, the reaction vessel will include a mechanical agitator, which will produce thorough mixing of the reactor contents and heat exchange system. Any quantity of the fluoromonomer(s) may be charged to the reactor vessel. The monomers may be charged batchwise or in a continuous or semicontinuous manner. By semi-continuous is meant that a plurality of batches of the monomer are charged to the vessel during the course of the polymerization. The independent rate at which the monomers are added to the kettle will depend on the consumption rate of the particular monomer with time. Preferably, the rate of addition of monomer will equal the rate of consumption of monomer, i.e. conversion of monomer into polymer.

The reaction kettle is charged with water, the amounts of which are not critical. To the aqueous phase there is generally also added the fluorinated surfactant, typically a nontelogenic fluorinated surfactant. The polymerization may also be carried out without addition of a fluorinated surfactant. The fluorinated surfactant when used, is typically used in amount of 0.01% by weight to 1% by weight. Suitable fluorinated surfactants include any fluorinated surfactant commonly employed in aqueous emulsion polymerization. Particularly preferred fluorinated surfactants are those that correspond to the general formula:

Y—$R_f$—Z—M wherein Y represents hydrogen, Cl or F; $R_f$ represents a linear or branched perfluorinated alkylene having 4 to 10 carbon atoms; Z represents $COO^-$ or $SO_3^-$ and M represents an alkali metal ion or an ammonium ion. Most preferred fluorinated surfactants for use in this invention are the ammonium salts of perfluorooctanoic acid and perfluorooctane sulphonic acid. Mixtures of fluorinated surfactants can be used.

A chain transfer agent can be used in the polymerization to control the molecular weight of the fluoropolymer. The chain transfer agent is typically charged to the reaction kettle prior to the initiation of the polymerization. Useful chain transfer agents include $C_2$-$C_6$ hydrocarbons such as ethane, alcohols, ethers, esters including aliphatic carboxylic acid esters and malonic esters, ketones and halocarbons. Particularly useful chain transfer agents are dialkylethers such as dimethyl ether and methyl tertiary butyl ether. Further additions of chain transfer agent in a continuous or semi-continuous way during the polymerization may also be carried out. For example, a fluoropolymer having a bimodal molecular weight distribution is conveniently prepared by first polymerizing fluorinated monomer in the presence of an initial amount of chain transfer agent and then adding at a later point in the polymerization further chain transfer agent together with additional monomer.

The polymerization is usually initiated after an initial charge of monomer by adding an initiator or initiator system to the aqueous phase. For example peroxides can be used as free radical initiators. Specific examples of peroxide initiators include, hydrogen peroxide, diacylperoxides such as diacetylperoxide, dipropionylperoxide, dibutyrylperoxide, dibenzoylperoxide, benzoylacetylperoxide, diglutaric acid peroxide and dilaurylperoxide, and further water soluble per-acids and water soluble salts thereof such as e.g. ammonium, sodium or potassium salts. Examples of per-acids include peracetic acid. Esters of the peracid can be used as well and examples thereof include tert.-butylperoxyacetate and tert.-butylperoxypivalate. A further class of initiators that can be used are water soluble azo-compounds. Suitable redox systems for use as initiators include for example a combination of peroxodisulphate and hydrogen sulphite or disulphite, a combination of thiosulphate and peroxodisulphate or a combination of peroxodisulphate and hydrazine. Further initiators that can be used are ammonium-alkali- or earth alkali salts of persulfates, permanganic or manganic acid or manganic acids. The amount of initiator employed is typically between 0.03 and 2% by weight, preferably between 0.05 and 1% by weight based on the total weight of the polymerization mixture. The full amount of initiator may be added at the start of the polymerization or the initiator can be added to the polymerization in a continuous way during the polymerization until a conversion of 70 to 80%. One can also add part of the initiator at the start and the remainder in one or separate additional portions during the polymerization. Accelerators such as for example water-soluble salts of iron, copper and silver may also be added.

During the initiation of the polymerization reaction, the sealed reactor kettle and its contents are conveniently preheated to the reaction temperature. Polymerization temperatures are from 20° C. to 150° C., preferred from 30° C. to 110° C. and most preferred from 40° C. to 100° C. The polymerization pressure is typically between 4 and 30 bar, in particular 8 to 20 bar. The aqueous emulsion polymerization system may further comprise auxiliaries, such as buffers and complex-formers. It was found, that the fluorinated allyl ethers can be beneficially copolymerized at high temperatures (>70° C.) producing fewer polar end groups, e.g. —COOH or —COF, as compared to a polymerization under identical polymerization conditions but using a fluorinated vinyl ether instead of a fluorinated allyl ether. The presence of a large amount of polar end groups is generally undesirable as such groups negatively impact the processability of the fluoropolymer.

The amount of polymer solids that can be obtained at the end of the polymerization is typically between 10% and 45% by weight, preferably between 20% and 40% by weight and the average particle size of the resulting fluoropolymer is typically between 50 nm and 500 nm.

The amorphous fluoropolymer includes a cure site component. To introduce a cure site component into the amorphous fluoropolymer, a monomer comprising the particular cure-site may be used or the polymerization may be conducted by using a chain transfer agent or initiator that is capable of introducing the cure site at the terminal ends of the polymer chain.

For example, in order to introduce halogens, which are capable of participation in the peroxide cure reaction, along the chain, the copolymerization of the basic monomers of the fluoropolymer may be carried out with a suitable fluorinated cure-site monomer. In one embodiment, the cure-site monomer can be an ethylenically unsaturated monomer that corresponds to the formula:

$CX_2$=$CX$—$R_f$—Z wherein each X independently represents H, F or Cl, $R_f$ represents a perfluorinated aliphatic group that may contain one or more oxygen atoms and Z represents Br or I that may be in terminal position of the perfluorinated aliphatic group or that may be on a carbon atom along the perfluorinated aliphatic group.

Further examples of comonomers can be selected for instance from:

(a) bromo- or iodo-(per)fluoroalkyl-perfluorovinylethers having the formula:

Z-$R_f$—O—$CY^1$=$CY^2Y^3$ wherein $Y^1$, $Y^2$ and $Y^3$ are F or H, Z is Br or I, $R_f$ is a (per)fluoroalkylene $C_1$-$C_{12}$, optionally containing chlorine and/or ether oxygen atoms; for example: BrCF$_2$—O—CF═CF$_2$, BrCF$_2$CF$_2$—O—CF═CF$_2$, BrCF$_2$CF$_2$CF$_2$—O—CF═CF$_2$, CF$_3$CFBrCF$_2$—O—CF═CF$_2$, and the like;

(b) bromo- or iodo (per)fluoroolefins such as those having the formula:

$$Z'-R'_f-CF=CF_2$$

wherein Z' is Br or I, R'$_f$ is a (per)fluoroalkylene C$_1$-C$_{12}$, optionally containing chlorine atoms; for instance: 4-bromoperfluorobutene-1, or 4-bromo-3,3,4,4-tetrafluorobutene-1;

(c) (per)fluorinated olefins having a Br or I atom on the olefin double bond such as bromotrifluoroethylene (BTFE);

(d) non-fluorinated bromo-olefins such as 4-bromo-1-butene.

In replacement of or in addition to the cure site comonomer, the fluoropolymer can contain a cure site component in terminal position, deriving from a suitable chain transfer agent introduced in the reaction medium during the polymer preparation, or derived from a suitable initiator. Examples of useful initiators include X(CF$_2$)$_n$SO$_2$Na with n═1 to 10 (where X is Br or I) or an initiator composition comprising ammonium persulfate and potassium bromide.

Examples of chain transfer agents include those having the formula R$_f$Br$_x$, R$_f$I$_x$ or R$_f$I/Br$_x$, wherein R$_f$ is a x-valent (per)fluoroalkyl radical C$_1$-C$_{12}$, optionally containing chlorine atoms, while x is 1 or 2. Examples include CF$_2$Br$_2$, Br(CF$_2$)$_2$Br, Br(CF$_2$)$_4$Br, CF$_2$ClBr, CF$_3$CFBrCF$_2$Br, and the like.

Alternatively, or additionally, the fluoropolymer may comprise cure site components that have a nitrile group. To introduce such nitrile containing cure site components, a nitrile group containing cure site monomer may be used in the polymerization process. In one embodiment useful nitrile group-containing cure site monomers include nitrile-containing fluorinated olefins and nitrile-containing fluorinated vinyl ethers, such as depicted below:

$$CF_2=CF-CF_2-O-R_f-CN$$

$$CF_2=CFO(CF_2)_LCN$$

$$CF_2=CFO[CF_2CF(CF_3)O]_g(CF_2O)_vCF(CF_3)CN$$

$$CF_2=CF[OCF_2CF(CF_3)]_kO(CF_2)_uCN$$

where, in reference to the above formulas: L═2-12; g═0-4; k═1-2; v═0-6; and u═1-4, R$_f$ is a perfluoroalkylene or a bivalent perfluoroether group. Representative examples of such a monomer include perfluoro(8-cyano-5-methyl-3,6-dioxa-1-octene), CF$_2$═CFO(CF$_2$)$_5$CN, and CF$_2$═CFO(CF$_2$)$_3$OCF(CF$_3$)CN.

Nitrile groups may also be introduced in the fluoropolymer at the terminal ends by initiating the polymerization in the presence of a nitrile group containing salt or pseudohalogen. Suitable nitrile group containing salts include those that have the nitrile group in the anion of the salt and in particular correspond to the formula:

$$M-(X_a-CN)_n$$

wherein M represents a mono- or multi-valent cation including a metal cation or an ammonium, X is O, S, Se or N, a has a value of 0 or 1 and n corresponds to the valence of the cation. Suitable cations M include organic (e.g. tetraalkylammonium cations) and inorganic cations. Particularly useful cations are ammonium and metal cations including mono-valent cations such as sodium and potassium as well as divalent cations such as calcium and magnesium. Examples of potassium salts include potassium cyanide, potassium cyanate and potassium thiocyanate. The salts wherein X is O or S and the cyanides are generally preferred.

In order to cure the fluoropolymer a cure composition can be used that comprises one or more peroxides. Suitable organic peroxides are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, α,α'-bis(t-butylperoxy-diisopropylbenzene), and di[1,3-dimethyl-3-(t-butylperoxy)butyl]carbonate. Generally, about 1-3 parts of peroxide per 100 parts of fluoropolymer is used.

Another component which is usually included in a cure composition based on an organic peroxide, is a coagent composed of a polyunsaturated compound which is capable of cooperating with the peroxide to provide a useful cure. These coagents can be added in an amount equal to 0.1 and 10 parts per hundred parts fluoropolymer, preferably between 2 to 5 parts per hundred parts fluoropolymer. Examples of useful coagents include triallyl cyanurate; triallyl isocyanurate; triallyl trimellitate; tri(methylallyl) isocyanurate; tris(diallylamine-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; N,N'-m-phenylenebismaleimide; diallyl-phthalate and tri(5-norbornene-2-methylene)cyanurate. Particularly useful is triallyl isocyanurate. Other useful coagents include the bis-olefins.

Further, if the cure site component comprises a nitrile, any cure composition suitable for curing nitrile components can also be used. For example, such nitrile cure composition may comprise one or more ammonia-generating compounds. "Ammonia-generating compounds" include compounds that are solid or liquid at ambient conditions but that generate ammonia under conditions of cure. Such compounds include, for example, hexamethylene tetramine (urotropin), dicyan diamide, and metal-containing compounds of the formula:

$$A^{w+}(NH_3)_vY^{w-}$$

where A$^{w+}$ is a metal cation such as Cu$^{2+}$, Co$^{2+}$, Co$^{3+}$, Cu$^{+}$, and Ni$^{2+}$; w is equal to the valence of the metal cation; Y$^{w-}$ is a counterion, typically a halide, sulfate, nitrate, acetate or the like; and v is an integer from 1 to about 7.

Also useful as ammonia-generating compounds are substituted and unsubstituted triazine derivatives such as those of the formula:

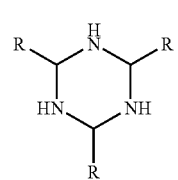

wherein R is a hydrogen or a substituted or unsubstituted alkyl, aryl, or aralkyl group having from 1 to about 20 carbon atoms. Specific useful triazine derivatives include hexahydro-1,3,5-s-triazine and acetaldehyde ammonia trimer.

The curable fluoroelastomer composition may contain further additives, such as carbon black, stabilizers, plasticizers, lubricants, fillers, and processing aids can be incorporated into the compositions, provided they have adequate stability for the intended service conditions. The compositions may be prepared by mixing the fluoropolymer, a cure composition and other additives in conventional rubber processing equipment. Such equipment includes rubber mills, internal mixers, such as Banbury mixers, and mixing extruders.

The curable fluoroelastomer compositions can be used to provide a fluoroelastomer upon curing. In one particular embodiment, the curable fluoroelastomer composition is extruded and cured to obtain a fluoroelastomer article, for example a tube. In another embodiment, the curable fluoroelastomer composition may be used in injection molding and cured to provide an injection molded article such as a gasket or O-ring.

The invention will now be further illustrated by the following examples without however the intention to limit the invention thereto.

EXAMPLES

Example 1

Preemulsion A for Precharge 169 g MA-1 fluorinated allyl ether monomer (4,7,9,11,13, 15-hexaoxaperfluorohexadec-1-en, $CF_2=CF-CF_2-O-CF_2-CF_2-O-CF_2-O-CF_2-O-CF_2-O-CF_2-O-CF_3$) was emulisified in 415 g deionised water together with 20 g perfluorooctanoate ammonium salt (APFOA). For the emulsification an Ultraturrax (available from IKA, Wilmington, N.C.) stirrer was used first for 1 min at 24.000 rpm stirrer speed, which was followed by three passes in a Microfluidizer (available from Microfluidics, Newton, Mass.) high shear homogenisator. This preemulsion had a turbid appearance and was stable for at least 12 h.

Preemulsion B for Feed:

720 g MA-1 monomer and 7 g BFTB (1,1,2,2-tetrafluoro-1-bromo-but-3-en, $CH_2=CH-CF_2-CF_2Br$) were emulsified in 593 g deionised water together with 10 g perfluorooctanoate ammonium salt (APFOA). For the emulsification an Ultraturrax (available from IKA, Wilmington, N.C.) stirrer was used first for 1 min at 24.000 rpm stirrer speed, which was followed by three passes in an Microfluidizer (available from Microfluidics, Newton, Mass.) high shear homogenisator.

A polymerization kettle with a total volume of 6.9 liters, equipped with an impeller agitator system, was charged with 2140 g deionized water and was heated up to 80° C. The agitation system was set to 320 rpm and in three following cycles, the vessel was degassed and subsequently charged with nitrogen to assure that all oxygen had been removed. The kettle was further charged with the preemulsion A, with 77 g vinylidenedifluoride (VF2) and with 41 g tetrafluoroethylene (TFE) to 10.0 bar absolute reaction pressure. The polymerization was then initiated by 22 g 5% APS solution (ammonium peroxodisulfate). As the reaction started, the reaction pressure of 10.0 bar absolute was maintained by the feeding TFE and VF2 into the gas phase with a feeding ratio TFE (kg),VF2 (kg) of 0.52. The reaction temperature of 80° C. was also maintained. The preemulsion B was charged into the kettle with a feeding ratio MA-1 preemulsion B (kg)NVF2 (kg) of 4.16. When 320 g VF2 feed was completed after 430 min the monomer valves were closed. The kettle was vented and flushed with $N_2$ in three cycles. The so obtained polymer dispersion had a solid content of 27.3%, the latex particle diameter was 177 nm according to dynamic light scattering.

The polymer dispersion was coagulated by adding it dropwise to an aqueous $MgCl_2$ solution, filtrated and washed four times with deionized water (60-70° C.). The polymer was dried overnight at 130° C. in an air circulating oven. The polymer shows no discernible melting transition and a glass transition temperature of −59° C. (midpoint value). The polymer had a Mooney viscosity (ML 1+10) of 19 and a MFI (265/5) of 83'. The copolymer contained 20.4 mol % TFE, 65.9 mol % VF2, 13.2 mol % MA-1 and 0.5 mol % BTFB.

Examples 2-5

In the same manner as in example 1 but using bromotrifluoro ethylene (BTFE) instead of BTFB as cure site monomer and varying the monomer composition, polymerizations were carried out according to the procedure as described in the example 2-5; BTFE was fed as a gas in precharge and during polymerization. The compositions of preemulsions, precharges, and polymerization feeds, the polymerization conditions and the analytical results are listed in table 1.

TABLE 1

|  | Example # | | | |
| --- | --- | --- | --- | --- |
|  | 2 | 3 | 4 | 5 |
| Ether | MA-2 | MA-2 | MA-3 | MA-2 |
| Preemulsion A: | | | | |
| ether (g) | 200 | 200 | 215 | 200 |
| water (g) | 470 | 470 | 387 | 470 |
| APFOA (30%) (g) | 20 | 20 | 20 | 20 |
| Preemulsion B: | | | | |
| ether (g) | 680 | 675 | 505 | 670 |
| water (g) | 645 | 633 | 706 | 635 |
| APFOA (30%) (g) | 10 | 10 | 15 | 10 |
| Precharge: | | | | |
| water (g) | 1330 | 1380 | 1425 | 2070 |
| TFE (g) | 41 | 38 | 62 | 65 |
| VF2 (g) | 77 | 72 | — | 42 |
| BTFE (g) | 2.4 | 1.9 | 2.3 | 2.1 |

TABLE 1-continued

| | Example # | | | |
|---|---|---|---|---|
| | 2 | 3 | 4 | 5 |
| Preemulsion | A | A | A | A |
| Initiator additive | 3.0 (Rongalit) | 3.0 (Rongalit) | — | — |
| Initiator (g) | 640 (0.3% t-BuOOH) | 620 (0.3% t-BuOOH) | 460 (5% APS) | 20 g (5% APS) |
| Polymerization feed: | | | | |
| TFE (g) | 155 | 155 | 561 | 275 |
| VF2 (g) | 299 | 302 | — | 180 |
| BTFE (g) | 8.4 | 5.8 | 8.1 | — |
| preemulsion (g) | 1320 (B) | 1280 (B) | 1180 (B) | 1315 (B) |
| pressure (bar) | 8 | 7 | 4–5 | 8 |
| temperature (° C.) | 50 | 30 | 85 | 80 |
| run time (min) | 380 | 290 | 418 | 330 |
| Particle size (nm) | — | 189 | 148 | — |
| Solid content (%) | 27.5 | 25.8 | 21.2 | 24.1 |
| Mooney viscosity (ML 1 + 10) | 12 | 34 | 36 | 36 |
| MFI(265/5 kg) (g/10 min) | 56 | — | — | 1.9 |
| $T_g$ (° C.) | −57 | −61 | −6 | −41 |
| Copolymer composition | | | | |
| TFE (mol %) | 22.3 | 20.6 | 88.3 | 43.9 |
| VF2 (mol %) | 63.6 | 65.9 | — | 43.3 |
| Ether (mol %) | 13.6 | 13.1 | 11.2 | 12.3 |
| BTFE (mol %) | 0.5 | 0.4 | 0.5 | 0.5 |
| Compounding | Rubber A | Rubber B | | |

MA-2: 4,7,9,11,13-pentaoxaperfluorotetradec-1-en ($CF_2$=CF—$CF_2$—O—$CF_2$—$CF_2$—O—$CF_2$—O—$CF_2$—O—$CF_2$—O—$CF_3$)
MA-3: 4,7-dioxaperfluorooct-1-en ($CF_2$=CF—$CF_2$—O—$CF_2$—$CF_2$—O—$CF_3$)
t-BuOOH: t-Butylhydroperoxide

Examples 6-7

In the following examples, the compositions are based on 100 parts of rubber. The curatives and other additives are listed as parts per hundred parts of rubber (phr). Percentages are weight % unless otherwise noted.

In example 6, a curable composition of invention was made by compounding the following curatives and additives into rubber A (example 2) using a two-roll mill and conventional techniques: 100 grams of rubber A, 50 grams of N-990 carbon black, 5 grams of ZnO, 1.8 grams of TAIC (98%), and 2.5 grams of DBPH-50. The cure rheology of the resulting curable composition was evaluated and the results are listed in table 2. Results of physical property testing after press curing of the sample at 177° C. for 10 minutes and post curing at 230° C. for 16 hours are also listed in table 2.

In example 7, a curable composition of the invention was made and evaluated in a manner similar to example 6 but using rubber B (example 3). The formulation and the other test results are also listed in table 2.

| | Example # | |
|---|---|---|
| | 6 | 7 |
| Rubber A | 100 | — |
| Rubber B | — | 100 |
| N-990 Carbon Black (phr) | 50 | 50 |
| ZnO (phr) | 5 | 5 |
| TAIC (phr) | 1.8 | 1.8 |
| DBPH-50 (phr) | 2.5 | 2.5 |

-continued

| | Example # | |
|---|---|---|
| | 6 | 7 |
| MDR @177° C., 0.5° Arc, 100 cpm | | |
| MDR total time (minutes) | 12 | 12 |
| $M_L$ (in-lbs) | 1.6 | 2.1 |
| $M_H$ (in-lbs) | 11.3 | 14.7 |
| $M_H - M_L$ (in-lbs) | 9.7 | 12.6 |
| $t_s2$ (min) | 0.5 | 0.5 |
| t'50 (min) | 0.8 | 0.8 |
| t'90 (min) | 2.7 | 2.7 |
| physical properties after Post Cure | | |
| Tensile (psi) | 850 | 1160 |
| Elongation (%) | 68 | 73 |
| 100% Modulus (psi) | — | — |
| Shore A2 Hardness | 80 | 74 |
| Compression Set, Method B, O-rings | | |
| 70 hrs @ 200° C. (%) | 24 | 22 |

The invention claimed is:

1. A polymerizable fluoropolymer composition comprising:
   (i) one or more gaseous fluorinated olefins,
   (ii) one or more perfluorinated allyl ethers of the formula:

$$CF_2=CF—CF(Z)—O—R_f \qquad (I)$$

wherein Z represents F or $CF_3$ and $R_f$ represents a perfluorinated alkyl group that optionally contains one or more catenary oxygen atoms, and (iii) one or more cure-sites selected from (a) a halogen capable of participating in a peroxide cure reaction or (b) a nitrile group wherein the polymerizable fluorinated composition has fewer polar end groups when polymerized at temperatures greater than 70° C. as compared to a composition polymerized under identical conditions comprising a perfluorinated vinyl ether in place of the perfluorinated allyl ether.

2. The polymerizable fluoropolymer composition according to claim 1 wherein Z represents F and wherein $R_f$ corresponds to the formula:

$$—(CF_2)_n—(OCF_2)_m—OR^a \qquad (II)$$

wherein n is an integer of 1 to 5, m is 0 or an integer of 1 to 10 and $R^a$ is a perfluoroalkyl group of 1 to 7 carbon atoms or an alkyl group of 1 to 7 carbon atoms.

3. The polymerizable fluoropolymer composition according to claim 1 wherein the fluoropolymer has a perfluorinated backbone.

4. The polymerizable fluoropolymer composition according to claim 1 wherein the amount of repeating units derived from the one or more fluorinated allyl ether is between 2 and 30 mol %.

5. The polymerizable fluoropolymer composition according to claim 1 wherein at least part of the cure-sites are comprised in end groups of the fluoropolymer.

6. The polymerizable fluoropolymer composition according to claim 1 wherein the amount of cure-sites in the fluoropolymer is between 0.1 and 5 mol %.

7. The polymerizable fluoropolymer composition according to claim 1 wherein the gaseous fluorinated olefins are selected from tetrafluoroethylene, chlorotrifluoroethylene, hexafluoropropylene, vinylidene fluoride, vinyl fluoride and mixtures thereof.

8. The polymerizable fluoropolymer composition according to claim 1 wherein the fluoropolymer further comprises repeating units derived from a non-fluorinated olefin.

9. The polymerizable fluoropolymer composition according to claim 8 wherein the non-fluorinated olefin is selected from ethylene and propylene.

10. The polymerizable fluoropolymer composition according to claim 1 wherein the fluoropolymer comprises repeating units deriving from vinylidene fluoride in an amount of not more than 45 mol %.

11. The polymerizable fluoropolymer composition according to claim 1 wherein the fluoropolymer is a polymer selected from copolymers of tetrafluoroethylene and vinylidene fluoride, copolymers of tetrafluoroethylene and ethylene or propylene, and copolymers of tetrafluoroethylene and hexafluoropropylene.

12. The polymerizable fluoropolymer composition according to claim 1 wherein the fluoropolymer is a polymer selected from copolymers of tetrafluoroethylene, vinylidene fluoride and hexafluoropropylene and copolymers of tetrafluoroethylene, hexafluoropropylene and ethylene or propylene.

13. The polymerizable fluoropolymer composition according to claim 1 wherein part or all of the cure-sites are derived from one or more monomers having a halogen capable of participating in a peroxide cure reaction or a nitrile group.

14. The polymerizable fluoropolymer composition according to claim 1 wherein the polymerizable fluoropolymer composition has a glass transition temperature of less than −25° C.

* * * * *

UNITED STATES PATENT AND TRADEMARK OFFICE
CERTIFICATE OF CORRECTION

PATENT NO. : 7,560,517 B2  Page 1 of 1
APPLICATION NO. : 11/280880
DATED : July 14, 2009
INVENTOR(S) : Klaus Hintzer It is certified that error appears in the above-identified patent and that said Letters Patent is hereby corrected as shown below:

Column 1
Line 22, delete ""Modem" and insert in place thereof -- "Modern --.

Column 5
Line 15, delete "nontelogenic" and insert in place thereof -- non-telogenic --.

Column 8
Line 29, delete "lamine-s" and insert in place thereof -- lamine)-s --.

Column 9
Line 31, delete "emulisified" and insert in place thereof -- emulsified --.

Column 10
Line 17, delete "(kg),VF2" and insert in place thereof -- (kg)/VF2 --.

Line 19, delete "NVF2" and insert in place thereof -- VF2 --.

Signed and Sealed this

Tenth Day of November, 2009

David J. Kappos
*Director of the United States Patent and Trademark Office*